United States Patent
Burdette et al.

(10) Patent No.: US 7,818,980 B2
(45) Date of Patent: Oct. 26, 2010

(54) FORMING GLASS SHEETS WITH IMPROVED SHAPE STABILITY

(75) Inventors: Steven Roy Burdette, Big Flats, NY (US); Longting He, Horseheads, NY (US); Lewis Kirk Klingensmith, Corning, NY (US); Liming Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 800 days.

(21) Appl. No.: 11/606,816

(22) Filed: Nov. 30, 2006

(65) Prior Publication Data

US 2008/0131651 A1 Jun. 5, 2008

(51) Int. Cl.
*C03B 17/00* (2006.01)
*C03B 17/06* (2006.01)

(52) U.S. Cl. ............................................. 65/90; 65/193
(58) Field of Classification Search ...................... 65/90, 65/193, 324, 333; 428/98
See application file for complete search history.

(56) References Cited

U.S. PATENT DOCUMENTS

| | | | |
|---|---|---|---|
| 1,753,805 A * | 4/1930 | Reece | 65/53 |
| 3,149,949 A | 9/1964 | Dockerty et al. | |
| 3,433,613 A * | 3/1969 | Dockerty | 65/145 |
| 3,451,798 A | 6/1969 | Simon | |
| 3,740,205 A | 6/1973 | Cayphas et al. | |
| 5,776,220 A | 7/1998 | Allaire et al. | 65/112 |
| 6,748,765 B2 * | 6/2004 | Pitbladdo | 65/53 |
| 6,990,834 B2 | 1/2006 | Pitbladdo | 65/29.21 |
| 2004/0027046 A1 * | 2/2004 | Choo | 313/477 R |
| 2005/0268655 A1 | 12/2005 | Butts et al. | 65/29.12 |
| 2006/0042314 A1 | 3/2006 | Abbott, III et al. | 65/25.3 |
| 2007/0144210 A1 * | 6/2007 | Pitbladdo | 65/90 |

FOREIGN PATENT DOCUMENTS

WO 2005/055284 6/2005

* cited by examiner

*Primary Examiner*—Jason L Lazorcik
*Assistant Examiner*—Cynthia Szewczyk
(74) *Attorney, Agent, or Firm*—Bruce P. Watson

(57) ABSTRACT

Systems, methods, apparatus and products relate to display glass from curved glass ribbons, to improve shape stability in glass ribbons, to creation of reduced stress glass ribbons, and to creation of improved shape stability and reduced stress of display glass, which may include forming slightly a curved glass ribbon in a fusion draw machine (FDM). One or more embodiments may include an isopipe having a desired curvature; an isopipe having a desired incline; an offset draw device operable to draw the glass ribbon in an inclined ribbon draw direction; one or more air jets or vacuum operable to apply air pressure to a first side of the glass ribbon, thereby creating a pressure differential on the first side; and/or one or more electrostatic force generators operable to apply electrostatic force to a first side of the glass ribbon, thereby generating an electric field differential across the glass ribbon.

17 Claims, 9 Drawing Sheets

710: GLASS MELT OVERFLOWS ISOPIPE, IS DRAWN DOWN ISOPIPE ROOT

↓

720: GLASS MELT LAYERS COMBINE AT BOTTOM EDGE OF ISOPIPE ROOT TO FORM GLASS RIBBON

↓

730: A DESIRED CURVATURE IS INDUCED IN GLASS RIBBON

- 731: THE DESIRED CURVATURE IS INDUCED USING AN ISOPIPE HAVING A DESIRED CURVATURE, E.G., A CURVED ISOPIPE ROOT
- 733: THE DESIRED CURVATURE IS INDUCED USING AN ISOPIPE HAVING A DESIRED INCLINE, SUCH AS AT THE ISOPIPE ROOT
- 735: THE DESIRED CURVATURE IS INDUCED BY DRAWING THE GLASS RIBBON IN AN INCLINED RIBBON DRAW DIRECTION
- 737: THE DESIRED CURVATURE IS INDUCED BY APPLYING AIR PRESSURE, SUCH AS FROM AIR JETS, ON ONE SIDE TO CREATE A PRESSURE DIFFERENTIAL
- 739: THE DESIRED CURVATURE IS INDUCED BY APPLYING ELECTROSTATIC FORCE, SUCH AS FROM ELECTROSTATIC FORCE GENERATORS, ON ONE SIDE TO CREATE AN ELECTRIC FIELD DIFFERENTIAL

740: THE CURVED GLASS RIBBON IS DRAWN FARTHER AND SETS

↓

750: THE SET CURVED GLASS RIBBON IS CUT INTO SHEETS OF CURVED GLASS

↓

760: THE SHEETS OF CURVED GLASS ARE PROCESSED TO CREATE DISPLAY GLASS SHEETS FOR USE IN LIQUID CRYSTAL DISPLAYS

FIG. 8 ically scheduled...

FORMING GLASS SHEETS WITH IMPROVED SHAPE STABILITY

BACKGROUND

1. Field of Invention

The present invention relates to methods, systems, apparatus and products relating to reduced stress display glass with improved shape/dimensional consistency by producing curved display glass ribbons, and in particular, curved glass ribbons formed in fusion draw machines (FDM) for the drawing of liquid crystal display (LCD) glass sheets.

2. Description of Related Art

Producing flat product glass for displays, such as LCDs, involves many challenges. A key requirement in this process is the ability to produce a very consistent product shape in large product glass plates. Typical large product glass sheets range in size up to 3.3 meters square.

Corning Incorporated has developed a process known as the fusion process (e.g., downdraw process) to form high quality thin glass sheets that can be used in a variety of devices like flat panel displays. The fusion process is the preferred technique for producing glass sheets used in flat panel displays because the glass sheets produced by this process have surfaces with superior flatness and smoothness when compared to glass sheets produced by other methods. The general fusion process is described in numerous publications, such as U.S. Pat. Nos. 3,338,696 and 3,682,609, and is well-known in the art.

One embodiment of the fusion process involves using a fusion draw machine (FDM) to form a glass sheet and then draw the glass sheet between two rolls to stretch the glass sheet to a desired thickness. A traveling anvil machine (TAM) is used to cut the glass sheet into smaller glass sheets that are sent to customers.

Residual product stress and shape can be caused in the glass sheet by a number of factors, such as the process temperature profile, the glass ribbon motion caused by the TAM and glass cutting. There are a number problems that can occur in the manufacture of liquid crystal displays whenever the residual stress of glass sheet is large or its shape is not stable.

In the fusion drawing technology, the isopipe delivers a large, thin, viscous sheet of glass melt. As the viscous sheet cools, it has a propensity to develop varying mechanical stresses—resulting for example from thermal gradients, ribbon thickness variations, residual stresses, and mechanical forces from the pulling drive systems. The ribbon has a typical width of the order of 2 meters and a length varying from 2 to 6 meters. The thickness of the ribbon is 1.1 mm or less.

With such a thin large ribbon, with normal process stresses variations within the ribbon, areas of compressive stress leads to the ribbon buckling. If the compressive stress is relatively large, then multimoded shape instability may be triggered. In such a case on a production fusion process, the ribbon shape can fluctuate. The glass product stress and shape can be affected if the ribbon shape fluctuates significantly and production must be discontinued. In severe cases, the glass ribbon within the fusion process can break from the instability.

In downflow drawing, and resulting fusion, of liquid crystal display (LCD) glass sheet, it is of critical importance that a manufacturer achieve stable production of LCD glass sheet with minimal residual stress and shape deformation at high flow density and large ribbon size. To reduce LCD panel manufacturing costs, panel makers are requiring larger and larger glass sheets, such as Gen 7, Gen 8 and beyond. As the sheet size increases, the fusion process control to maintain product shape and stress capability becomes more demanding.

In the formation of LCD glass ribbon, it is desirable to have the bow in the same direction to maintain process stability. It is also desirable for LCD customers to have glass sheets with consistent shape and stress pattern. Meeting some of these customer desires, the ribbon forming process according to the prior art design hangs a flat sheet, shown in FIG. 1, vertically in a neutral position stabilized mainly by gravity and the drive rollers. This set-up, however, has a sensitivity to ribbon buckling and motion instability with occasional production variability, for example, of cutoff system or process temperatures. In these cases, manufacturing of product is discontinued until shape stability is restored. Therefore, it would be beneficial to control the bow direction and ribbon shape in the FDM versus the prior art.

As product glass sizes increase, control of the residual stress and shape deformation become more difficult. Nevertheless, larger glass product sizes are desired, and thus it is necessary to develop new products and methods that achieve larger-size product glass having residual stress and shape deformation within acceptable ranges.

SUMMARY OF THE INVENTION

In accordance with one or more embodiments of the present invention, systems, methods, apparatus and products related to display glass form curved glass ribbons, for improving shape stability in glass ribbons, creation of reduced stress glass ribbons, and creation of a more shape/dimensionally stable of display glass, which may include forming a slightly curved glass ribbon in a fusion draw machine (FDM).

According to one or more embodiments of the present invention, a method of improving shape stability in a glass ribbon drawn from an isopipe overflowing with molten glass may include inducing a curvature in the glass ribbon, thereby creating a curved glass ribbon; and setting the curved glass ribbon.

According to one or more embodiments of the present invention, an apparatus for improving shape stability in a glass ribbon drawn from an isopipe overflowing with molten glass may include a curvature inducing component operable to induce a curvature in the glass ribbon.

According to one or more embodiments of the present invention, a system for creating improving shape stability in glass ribbons may include a fusion draw machine having an isopipe operable to produce a glass ribbon; and a curvature inducing component operable to induce a curvature in the glass ribbon.

According to one or more embodiments of the present invention, a method of creating improved shape stability in display glass may include drawing a glass ribbon from an isopipe overflowing with molten glass; inducing a curvature in the glass ribbon, thereby creating a curved glass ribbon; setting the curved glass ribbon; and preparing display glass sheets from the curved glass ribbon.

According to one or more embodiments of the present invention, a product of the present invention may include display glass having improved shape stability; wherein the display glass is formed from a curved glass ribbon, and wherein the curved glass ribbon is formed by inducing a curvature in a glass ribbon being drawn from an isopipe, and setting the curved glass ribbon.

In various embodiments of the present invention, inducing a curvature in the glass ribbon may include: using an isopipe having a desired curvature; using an isopipe having a desired incline; drawing the glass ribbon in an inclined ribbon draw direction; applying air pressure to a first side of the glass ribbon, thereby creating a pressure differential on the first side; and/or applying electrostatic force to a first side of the glass ribbon, thereby generating an electric field differential across the glass ribbon.

In various other embodiments of the present invention, the curvature inducing component may include: an isopipe having a desired curvature; an isopipe having a desired incline; an offset draw device operable to draw the glass ribbon in an inclined ribbon draw direction; one or more air jets or vacuums operable to apply air pressure to a first side of the glass ribbon, thereby creating a pressure differential on the first side; and/or one or more electrostatic force generators operable to apply electrostatic force to a first side of the glass ribbon, thereby generating an electric field differential across the glass ribbon.

In various further embodiments of the present invention: a root of the isopipe may include the desired curvature; the desired incline may comprise an angle in the range from 5 to 20 degrees from vertical; a root of the isopipe may include the desired incline; the inclined ribbon draw direction may comprise an angle in the range from 5 to 20 degrees from vertical; the pressure differential may be between 2 and 15 N/m$^2$; one or more air jets or vacuums may apply the air pressure; the air jets or vacuums comprise an array of air jets or vacuums of 3×3 to 5×5; one or more electrostatic force generators may apply the electrostatic force; and the curvature in the glass ribbon may have a curvature radius ranging from 5 to 50 meters, thereby creating a bow ranging from 5 mm to 100 mm.

The advantages of this invention are best understood after reading the detailed technical description, and in relation to existing glass quality control processes. Nonetheless, the advantages may include the scalability of the process and system to produce large product glass.

In the present invention, a curved ribbon is prescribed to control the bow direction in the process of glass ribbon forming. In such a method, a slightly curved ribbon having a partially cylindrical shape is formed in the process. This curved ribbon has a developable shape. Almost no residual product stress results from a prescribed developable shape. In comparison with the prescribed flat ribbon, there are three primary advantages of the curved ribbon.

Among other advantages, the bow is controlled at a chosen direction. When the ribbon is perfectly flat, thermal mechanical stress in the ribbon may result in ribbon distortion or instability, such as buckling and bow formation in either direction. When a curvature is prescribed, it becomes difficult for the thermal mechanical stress to change the bow direction.

The curved ribbon prescribes the ribbon shape to its most stable form—a simple bow. With the present flat fusion draw process, especially with wider ribbons and variations in process temperatures; multiple moded (complex) ribbon shapes can result. Experience shows that product shape is more consistent and product stress levels are lower with process ribbon shapes that are simple stable bows. Insofar as the prescribed ribbon shape dominates the structural alignment, multiple moded ribbon shapes have difficulty developing when there is a bow or curvature in the ribbon. Generally speaking, it is desirable for display glass customers that there is a consistent sheet bow direction and stress pattern. A curved ribbon is stiffer than a flat ribbon, increasing the resiliency of the ribbon.

The shape of the glass sheet is an important attribute for display panel fabricators in their manufacturing process. For example, the glass shape is important to the amount of sag it exhibits when suspended on horizontal racks. This sag is also critical to the clearance required for predictable manipulation by robots, for example. Often display panel fabricators will desire specification on this sheet sag to improve their processing. The sheet sag is controlled in the sheet drawing process by managing the shape of the ribbon. This invention of a curved draw process, enabling a more prescribed sheet shape, would be of significant benefit to consistent sheet sag for display panel fabrication.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the issued claims. The drawings may not be to scale, and the aspects of the drawings may not be to scale relative to each other.

DETAILED DESCRIPTION OF THE PRESENT INVENTION

The present invention provides for ribbon shape stability, residual stress reduction, and bow direction control through formation of slightly curved glass ribbon in fusion draw machines (FDM). The curved ribbon may have a cylindrical developable shape. With such a curvature, the compressive thermo-mechanical stress caused by cooling and the across-draw temperature variation may be released. The curvature in accordance with the present invention makes it difficult for the thermo-mechanical stress to change the bow direction. Therefore, bow may be controlled in a chosen direction. The curved ribbon also releases the compressive stress release via changing the ribbon curvature when a compressive stress is applied to the curved ribbon. The curved ribbon inhibits the development of high frequency modes insofar as the prescribed ribbon shape dominates, making development of the high frequency modes difficult. Furthermore, the curved ribbon has a higher stiffness than a flat ribbon. To the extent that the curved ribbon is stiffer than the flat ribbon, ribbon motion in the FDM decreases.

Any one of various embodiments may be used to generate the curved glass ribbon. Four exemplary methods of the present invention to generate a curved ribbon may include: (i) use of a curved isopipe, (ii) use of an inclined FDM or inclined ribbon drawing, (iii) use of an air pressure panel, and (iv) use of electrostatic or magnetic force or combinations thereof. Moreover, the present invention may be used in combination with other innovative techniques, such as temperature controls, to produce glass sheets with low residual stress, high flow density and large ribbon size.

Figures 1, 2A, 2B:
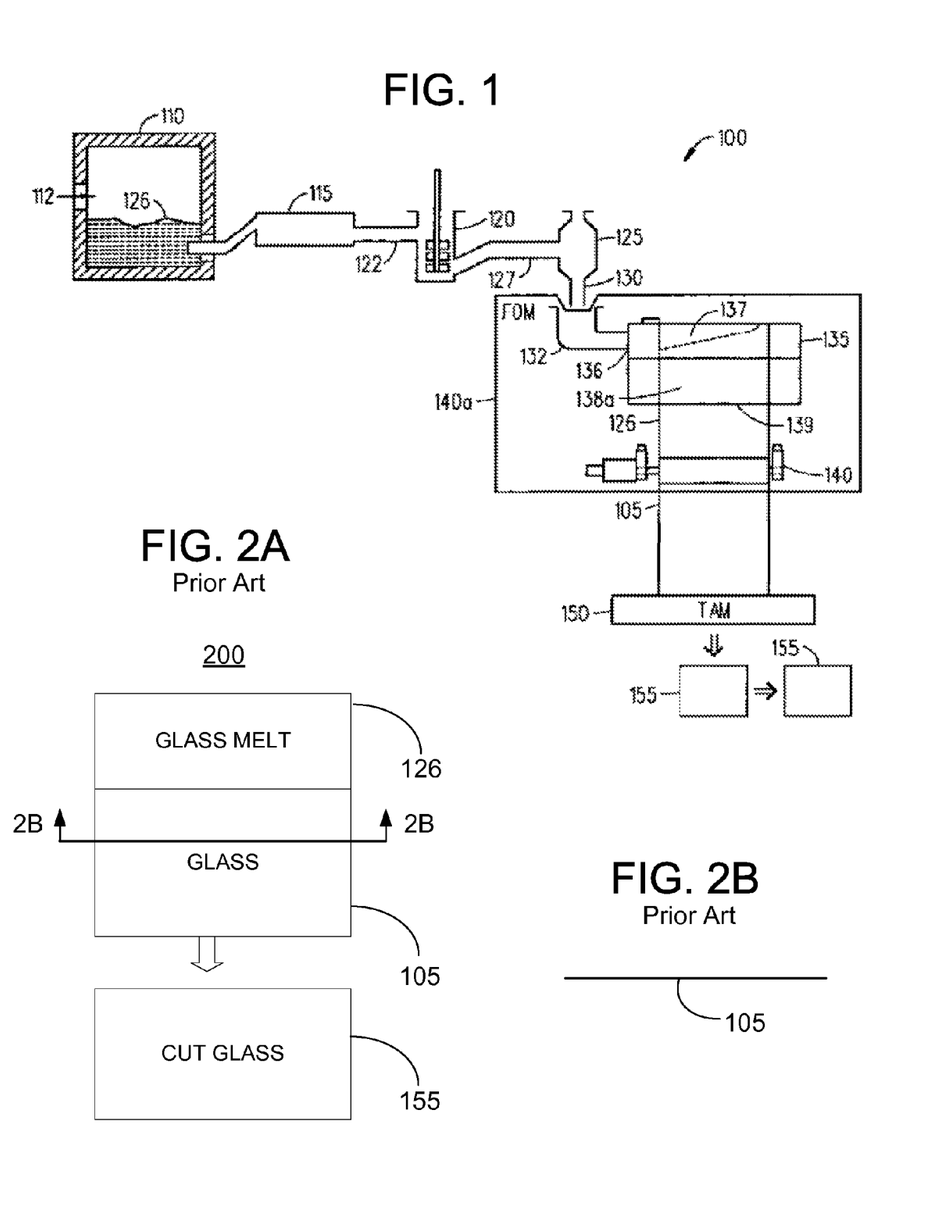
FIG. 1 is a block diagram illustrating an exemplary glass manufacturing system incorporating a fusion draw machine producing a flat isopipe glass draw.
FIG. 2A is a isometric block diagram, looking somewhat down, illustrating a flat isopipe glass draw.
FIG. 2B is a cross-sectional view taken along line 2B-2B of FIG. 2A.

Referring to FIG. 1, there is shown a schematic view of an exemplary glass manufacturing system 100 that uses the fusion process to make a glass sheet 105 having a flat isopipe glass draw. The glass manufacturing system 100 includes a melting vessel 110, a fining vessel 115, a mixing vessel 120 (e.g., stir chamber 120), a delivery vessel 125 (e.g., bowl 125), a fusion draw machine (FDM) 140a, and a traveling anvil machine (TAM) 150. The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127. The delivery vessel 125 delivers the molten glass 126 through a downcomer 130 into the FDM 140a which includes an inlet 132, a forming vessel 135 (e.g., isopipe 135), and a pull roll assembly 140.

As shown, the molten glass 126 from the downcomer 130 flows into an inlet 132 which leads to the forming vessel 135 (e.g., isopipe 135). The forming vessel 135 includes an opening 136 that receives the molten glass 126 which flows into a trough 137 and then overflows and runs down two sides 138a and 138b (138b is behind 138a and not visible) before fusing together at what is known as a root 139. The root 139 is where the two sides 138a and 138b come together and where the two overflow walls of molten glass 126 rejoin (e.g., refuse) before being drawn downward by the pull roll assembly 140 to form the glass sheet 105. The TAM 150 then cuts the drawn glass sheet 105 into distinct pieces of glass sheets 155.

Referring to FIGS. 2A and 2B, a block diagram illustrates a flat isopipe glass draw 200. The flat isopipe glass draw 200 is representative of a glass draw from system 100, insofar as the root 139 is flat, hence making forming vessel 135 a flat isopipe 135. Thus, the molten glass 126 and glass sheet 105 are flat also.

By way of example, the product glass may comprise CORNING INCORPORATED GLASS COMPOSITION NO. 1737 or CORNING INCORPORATED GLASS COMPOSITION NO. EAGLE$^{2000}$™. These glass materials have numerous uses, in particular, for example, the production of liquid crystal displays.

Figure 3A:
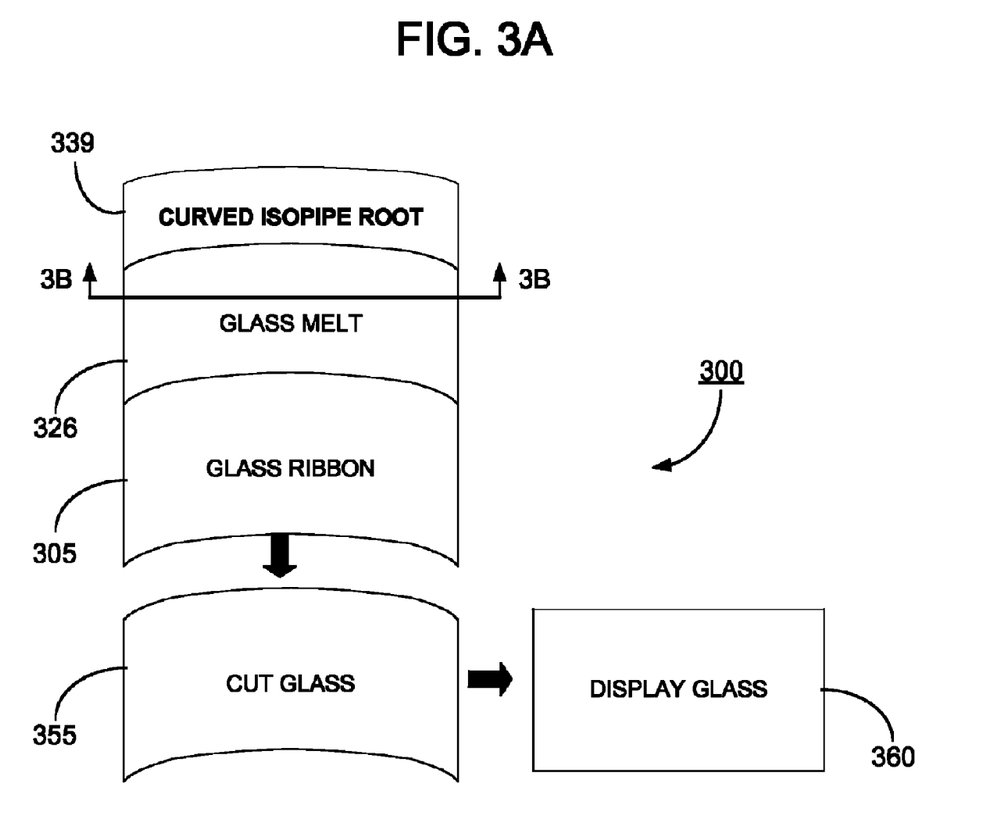
FIG. 3A is an isometric block diagram, looking somewhat down, illustrating an exemplary curved isopipe glass draw in accordance with one or more embodiments of the present invention.
Figure 3B:
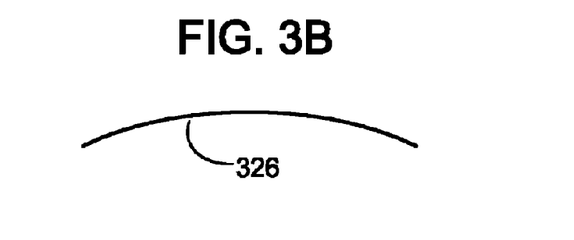
FIG. 3B is a cross-sectional view taken along line 3B-3B in FIG. 3A.

Referring to FIGS. 3A and 3B, a block diagram illustrates an exemplary curved isopipe glass draw 300 in accordance with one or more embodiments of the present invention. Curved isopipe glass draw 300 may be produced, for instance, by a curved isopipe root 339, of a curved isopipe. When the isopipe is curved, the curved isopipe generates a curved uniform viscous sheet of glass melt 326. Upon cooling through glass transition temperature, the curved shape of the viscous glass sheet is frozen into a curved glass ribbon 305, which will still hang vertically, but will have more resistance to shape change and horizontal perturbations. The glass ribbon 305 may then be cut into distinct sheets of cut glass 355, which may be subdivided into individual display glass sheets 360. The shape is developable and will not result in additional stresses when the product sheet is flattened.

Detailed value for the curvature radius of the isopipe or isopipe root 339 depends on the process temperature profile, mechanical constraints, and ribbon dimension. To control the bow direction, a curvature radius ranging from 5 to 50 meters generates a sufficient effect to determine the bow direction. Such a slightly curved isopipe forms a partially cylindrical glass ribbon in FDM 140a. With this range of curvature radius, the bow ranges from 5 mm to 100 mm for glass sheet size of 1-4 m. Since the curvature radius is very large, neither the uniformity nor the dynamics profile of the viscous sheet 305 is significantly affected.

The curved viscous sheet 305 could be achieved by either modifying the current isopipe 135 or creating a new design. For instance, an existing isopipe 135 could be bent accordingly, the root 139 of an existing isopipe 135 could be bent accordingly, or a curvature adapter could be attached to an existing root 139 to act as a curved isopipe root 339. Alternatively, a new isopipe could be designed, having the desired curvature throughout, or just at the curved root 339.

Figure 4A:
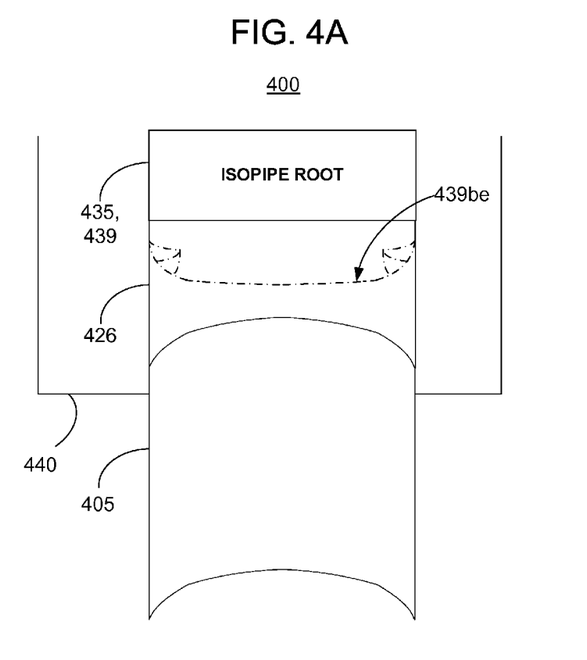
FIG. 4A is an isometric block diagram, looking somewhat down, illustrating an exemplary curved isopipe glass draw that is inclined in accordance with one or more embodiments of the present invention.
Figure 4B:
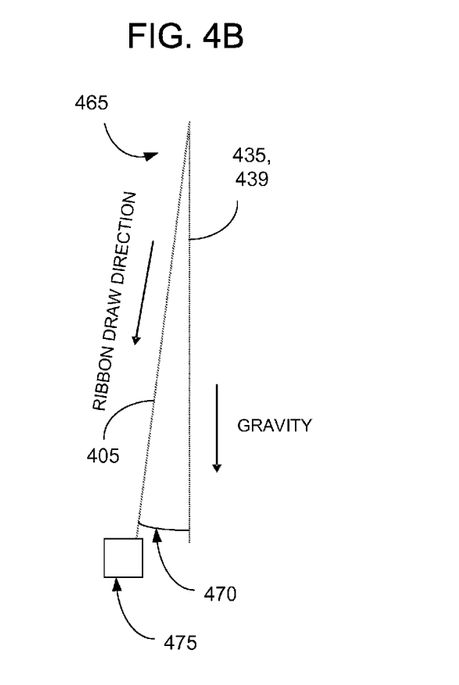
FIG. 4B is a diagrammatic side view of the inclined draw of FIG. 4A.

Referring to FIGS. 4A and 4B, a block diagram illustrates an exemplary curved isopipe glass draw 400 that is inclined in accordance with one or more embodiments of the present invention. According to one or more embodiments of the present invention, an inclined curved isopipe glass draw 400 may include an inclined isopipe 435, which may be flat or curved, such as having a curved root 439, and/or an inclined glass draw direction 465 for the formation of curved glass ribbon 405 in FDM 440.

Using an inclined glass draw direction 465, the FDM 440 may be vertical, or inclined as well. With a very small angle 470 between the ribbon draw direction 465 and gravity force direction, the force of gravity causes the ribbon 405 to curve at the edges, especially when the draw is supported mostly in the center of the ribbon 405. As discussed below, this asymmetrical condition also may damp possible horizontal oscillations.

The inclined glass draw direction 465 may be achieved, for instance, with reference to FIG. 1, by offsetting the pull roll assembly 140 or the TAM 150 forward or backward from the isopipe 135 by an angle 470. More generally, an offset draw device 475 of FDM 440 may be used to effect the inclined glass draw direction 465, and the offset draw device 475 may be offset more or less to increase or decrease angle 470 to adjust the effects of incline on the ribbon 405.

Using an inclined isopipe 435, the root 439 may be flat or curved. If a curved root 439 is used, the curvature may exist in a bottom edge 439be that is rounded and/or beveled (shown by the dash-dotted line), keeping the plane of the root flat, as in root 139, so that the glass melt 426 may roll off the far rounded corners of the inclined bottom edge substantially simultaneously to rolling off the center of the root 439, so that the ribbon 405, falling vertically in absence of other factors, will resemble the ribbon 305 in draw 300.

In this situation, the incline 470 of the ribbon draw direction 465 is present as the glass melt 426 flows down sides 138a and 138b of root 439, and the draw 400 thereafter may be either vertical (not inclined) or at an angle less than angle 470, so that the curvature of the root 439 is utilized. If the draw 400 is at an angle equal to or greater than incline 470 in this configuration, the rounded or beveled bottom edge 439be of the curved root 439 may have little effect, resulting in a situation not unlike the above scenario where the incline 470 exists in the ribbon draw direction 465, while using a root 439 without a curvature.

Whether using an inclined isopipe 435 or an inclined ribbon draw direction 465, the ribbon 405 curves due to gravity. Since the ribbon 405 is thin and wide, a very small inclined angle 470 leads to sufficient curvature for the purpose of stress release. Based on relationship between the out-of-plane deformation and gravity force, an appropriate incline angle 470 may lie in the range from 5 to 20 degrees from vertical as shown, depending on the circumstances of the draw (glass composition, temperature, speed, width, height of fusion draw machine, etc.).

In addition to generation of a curved ribbon, the inclined ribbon draw 400 advantageously may damp possible ribbon motion. When the ribbon drawing direction 465 is the direction of gravity (i.e., vertical), the ribbon 405 is neutrally stable at its steady position, but having no horizontally stabilizing factor. Tiny external perturbations may cause the ribbon 405 to oscillate horizontally around this vertical position. When the ribbon 405 is inclined, the perturbation has to be sufficiently strong to overcome the vertical vector of the gravity force to the ribbon 405 as well as the horizontal vector of the force of ribbon draw direction 465 to cause motion in the ribbon 405. The inclined ribbon draw 400 introduces a damping effect to reduce possible ribbon motion.

Figure 5A:
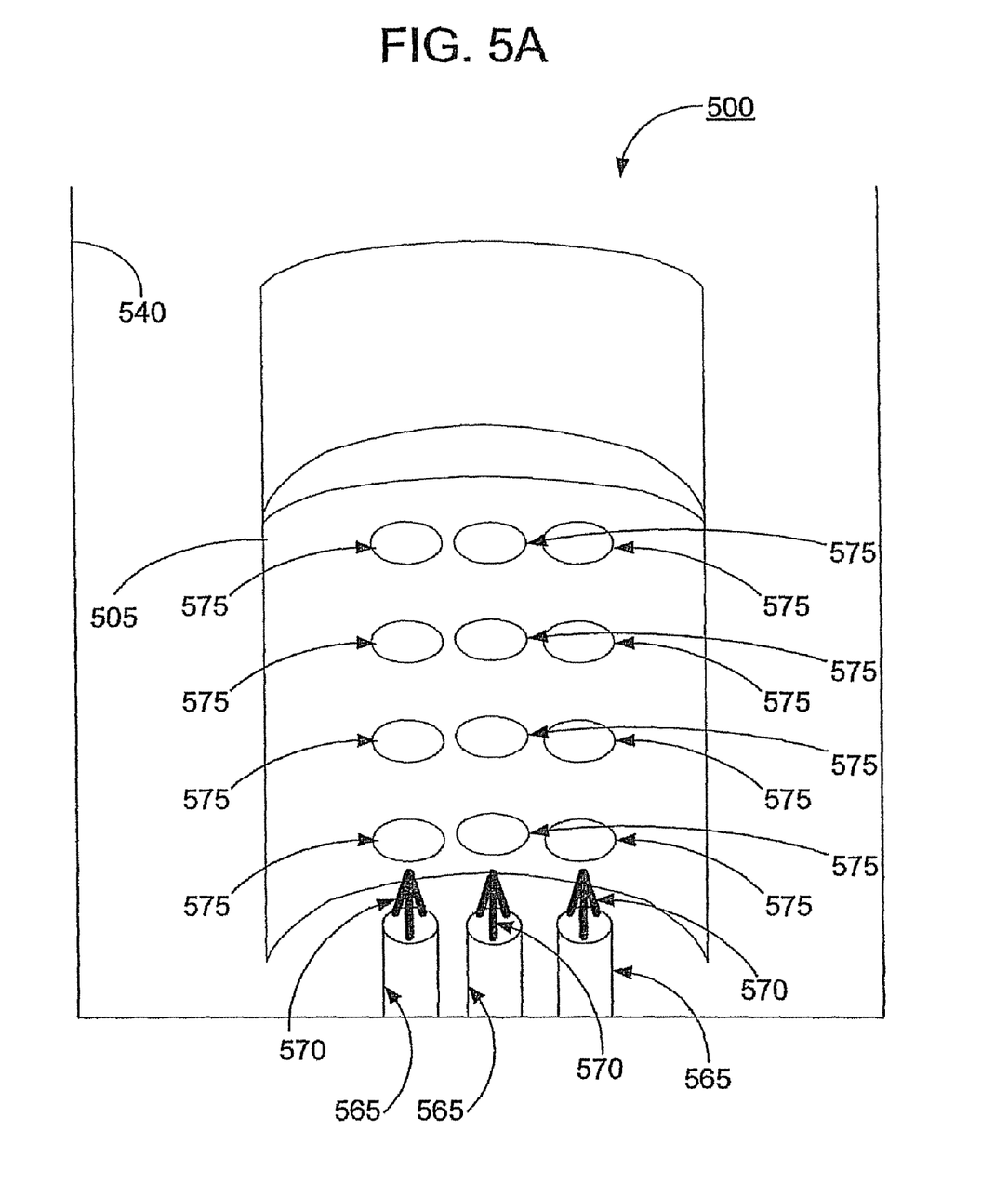
FIG. 5A is an isometric block diagram, looking somewhat down, illustrating another exemplary curved isopipe glass draw from a fusion draw machine having air jets or vacuums in accordance with one or more embodiments of the present invention.
Figure 5B:
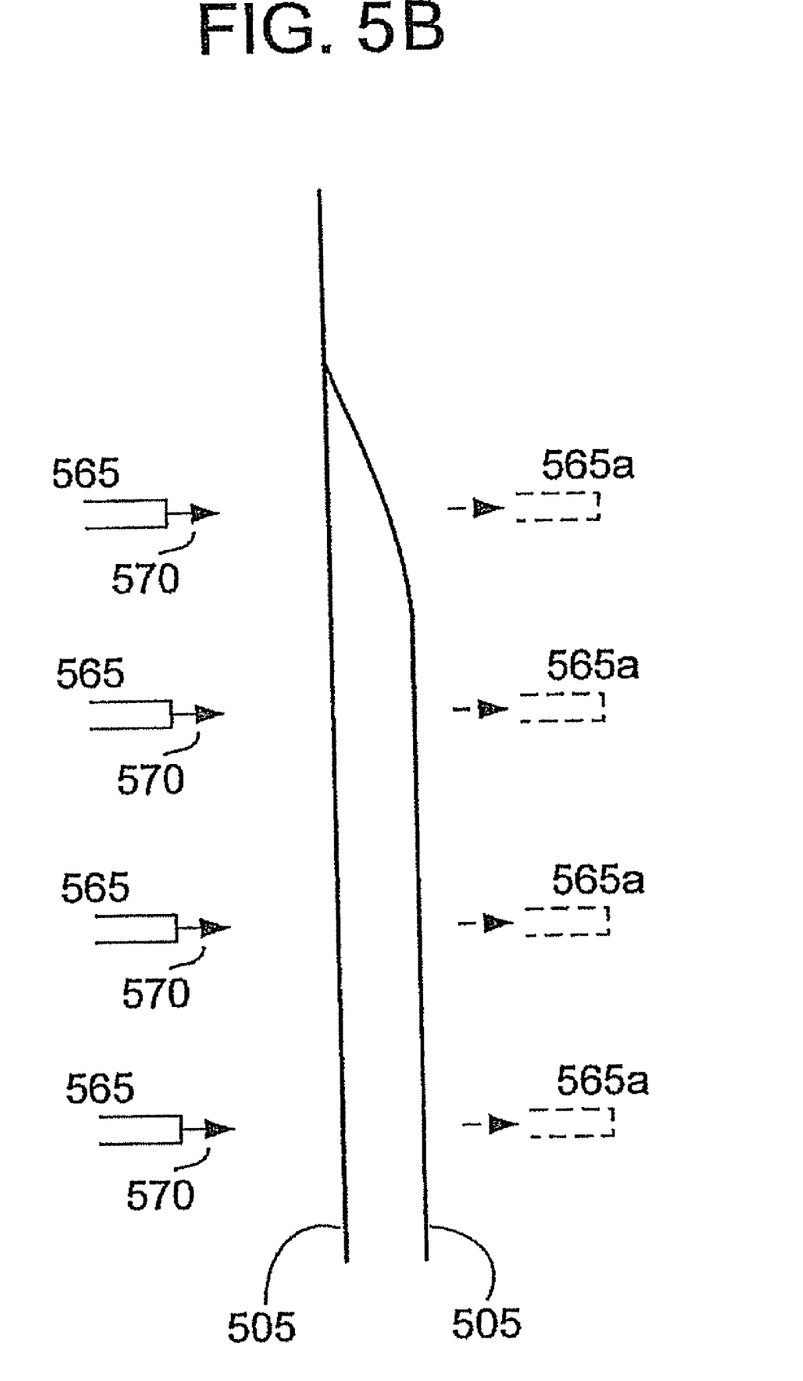
FIG. 5B is a diagrammatic side view of the glass draw of FIG. 5A.

Referring to FIGS. 5A and 5B, a block diagram illustrates another exemplary curved isopipe glass draw 500 from a fusion draw machine 540 having air jets 565 and/or vacuums 565a in accordance with one or more embodiments of the present invention. Application of air pressure 570 from the air jets 565 and/or vacuums 565a may create a curved ribbon 505. An array of air jets 565 or vacuum 565a may be installed within an existing or newly designed FDM 540. The air jets 565 and/or vacuums create a pressure difference between two sides, corresponding to the two sides 138a and 138b, of the ribbon 504. The pressure difference results in ribbon curvature. The number and strength of jets 565 and/or vacuums may be adjusted in practice, according to the circumstances of the draw (glass composition, temperature, speed, width, etc.). Furthermore, the air jets 565, and/or vacuums may be used to affect the ribbon temperature.

The array of air jets 565 and/or vacuums 565a is arranged to act on one side of the ribbon 505 at impact points 575, such as rear side 138b, behind the front of the ribbon 505, in the area from the glass setting zone to about 50 inches below the setting zone. This corresponds to the ribbon 505 in the temperature range from 900 C to 300 C. The pressure difference on two sides of the ribbon 505 also may dampen ribbon motion, analogous to the dampening by draw inclination of draw 400, by providing a biased, horizontal non-contact support of the ribbon 505.

Due to the fact that the glass ribbon 505 is large and thin, only a small pressure difference generates sufficient curvature of the ribbon 505 to control the bow direction. For an LCD glass ribbon 505, a pressure difference of 2 to 15 N/m$^2$ creates a curved ribbon with an out-of-plane deformation larger than 5 mm. The ribbon curvature from the air pressure difference may be adjusted by varying the positions of air jets 565 and/or vacuums 565a, the air flow pressure 570 and air temperature to achieve optimal ribbon shape. As such, use of air pressure differentials acts as an active control method for the ribbon shape.

To avoid excessive localized shape distortion in the ribbon 505, the applied air pressure 570 should not be focused in a narrow impact area 575. If the air jet 565 and/or vacuums 565a are focused on one particular position, the air jet or vacuum itself may create undesirable and undevelopable out-of-plane deformation. An array of air jets or vacuums having a substantially uniform distribution may be adjusted to create a partially cylindrical curvature. For practical application, an array of air jets 565 or vacuums 565a may be arranged 3×3 to 5×5, such as the 3×4 array in FIG. 5, to create a sufficiently uniform distribution of air pressure 570 across the ribbon 505. However, it will be appreciated that the air jets and/or vacuums may create a pressure distribution that varies across the ribbon 505. For example, the pressure differential between the front and the back sides or faces of the ribbon may be larger in the center of the ribbon than near the edges of the ribbon. The number of jets 565 or vacuums 565a is not limited to this range. The air jets 565 or vacuums 565a may be continuously active during draw 500. To compensate for the fact that the air jets 565 or vacuums 565a may modify slightly the progressive cooling of the ribbon 505, the system 100 may, for instance, increase the winding power or adjust the air temperature. The temperature of air being emitted from the jets would preferably match the temperature of the glass, in order to avoid created thermal gradients and stresses in the ribbon.

Figure 6A:
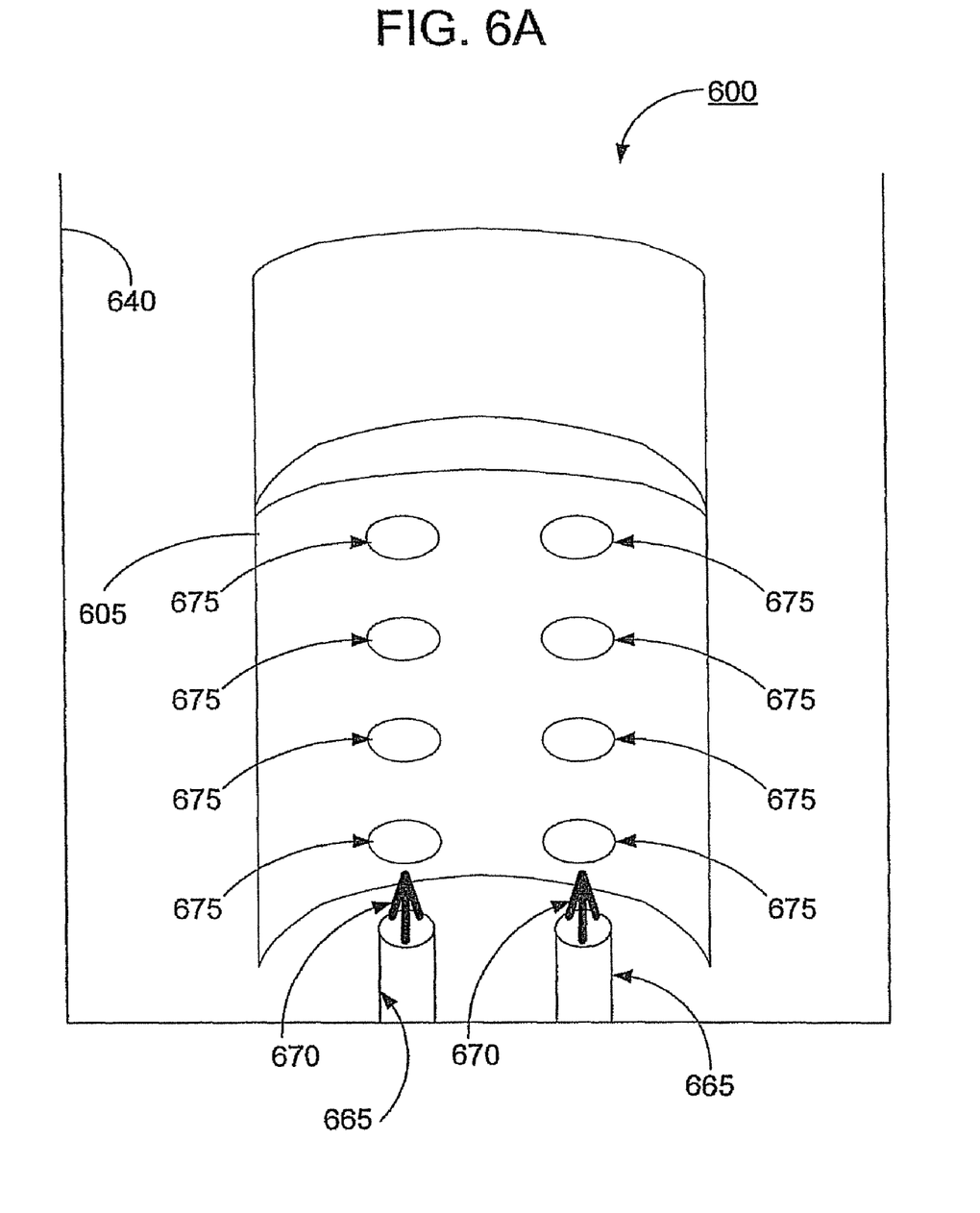
FIG. 6A is an isometric block diagram, looking somewhat down, illustrating a further exemplary curved isopipe glass draw from a fusion draw machine having electrostatic force generators in accordance with one or more embodiments of the present invention.
Figure 6B:
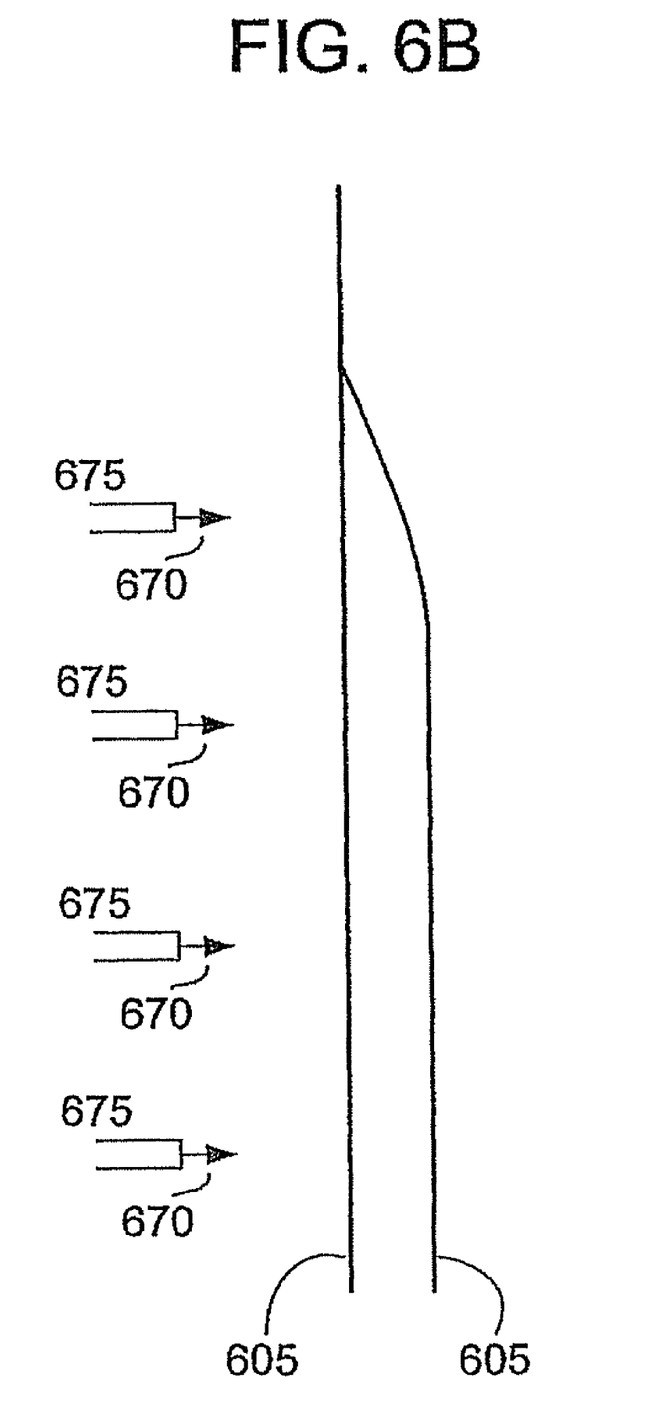
FIG. 6B is a diagrammatic side view of the glass draw of FIG. 6A.

Referring to FIGS. 6A and 6B, a block diagram illustrates another exemplary curved isopipe glass draw 600 from a fusion draw machine 640 having electrostatic force generators 665 in accordance with one or more embodiments of the present invention. The electrostatic force generators 665 may apply electrostatic force 670 to pull or push the ribbon 605, due to an electric field differential, to form a curved shape. Due to potential temperature variations at the application points 675 of electrostatic force 670, some surface charges may develop on the ribbon 605. Insofar as a few Pascal of resulting pressure can change the ribbon shape, the electric field 670 needed to induce a desired curvature is of the order of 10$^6$ V/m. Although the means of exerting force differ between draw 500 (air pressure 570) and draw 600 (electric field 670), draw 500 and draw 600 share similarities regarding the adjustment of process parameters to affect different curvatures in the ribbon 505 and 605.

Figure 7:
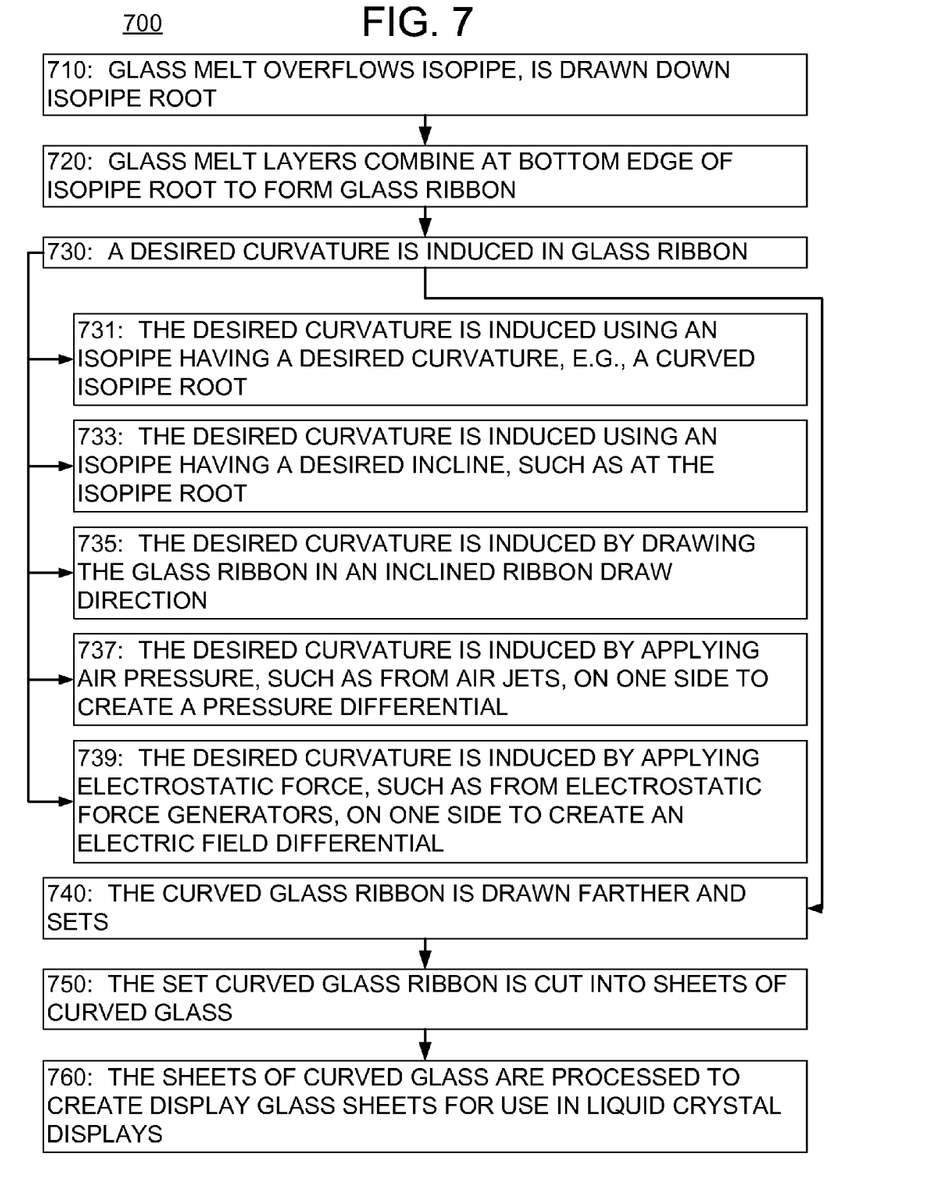
FIG. 7 is a flow diagram illustrating process actions that may be carried out to create curved glass in accordance with one or more embodiments of the present invention.

Referring to FIG. 7, a flow diagram illustrates process actions that may be carried out to produce improved shape stability in glass ribbons and/or create reduced stress glass ribbons in accordance with one or more embodiments of the present invention. An exemplary assembly process 700 may include some or all of the following actions. Insofar as the embodiments of FIG. 3, FIG. 4, FIG. 5 and FIG. 6 generally are not mutually exclusive, actions associated with two or more such embodiments may be combined to create a more sophisticated, albeit potentially more expensive, process 700.

In action 710 of process 700, molten glass may overflow from an isopipe of an FDM and be drawn down sides of the isopipe root.

In action 720, the molten glass layers from either side of the isopipe root may combine at the bottom edge of the root to form a glass ribbon.

In action 730, a desired curvature may be induced in the glass ribbon, such as while the glass ribbon is in the molten glass stage prior to cooling to the glass transition point and setting. Action 730 may include one or more of actions 731, 733, 735, 737 and 739.

In action 731, a desired curvature may be induced in the glass ribbon by using an isopipe with a desired curvature, such as in the isopipe root.

In action 733, a desired curvature may be induced in the glass ribbon by using an isopipe with a desired incline, such as at the isopipe root, possibly including a rounded bottom edge.

In action 735, a desired curvature may be induced in the glass ribbon by drawing the glass ribbon in an inclined ribbon draw direction.

In action 737, a desired curvature may be induced in the glass ribbon by applying air pressure on one side of the ribbon, such as from air jets, to create a pressure differential that causes the ribbon to curve.

In action 739, a desired curvature may be induced in the glass ribbon by applying electrostatic force on one side of the ribbon, such as from electrostatic force generators, to create an electric field differential that causes the ribbon to curve.

In action 740, the curved glass ribbon may be drawn down farther and caused or allowed to cool and set, forming a curved ribbon of set glass.

In action 750, the curved ribbon of set glass may be cut into curved glass sheets.

In action 760, the curved glass sheets may be processed and sized to create of display glass sheets for use in displays, such as liquid crystal displays.

Figure 8:
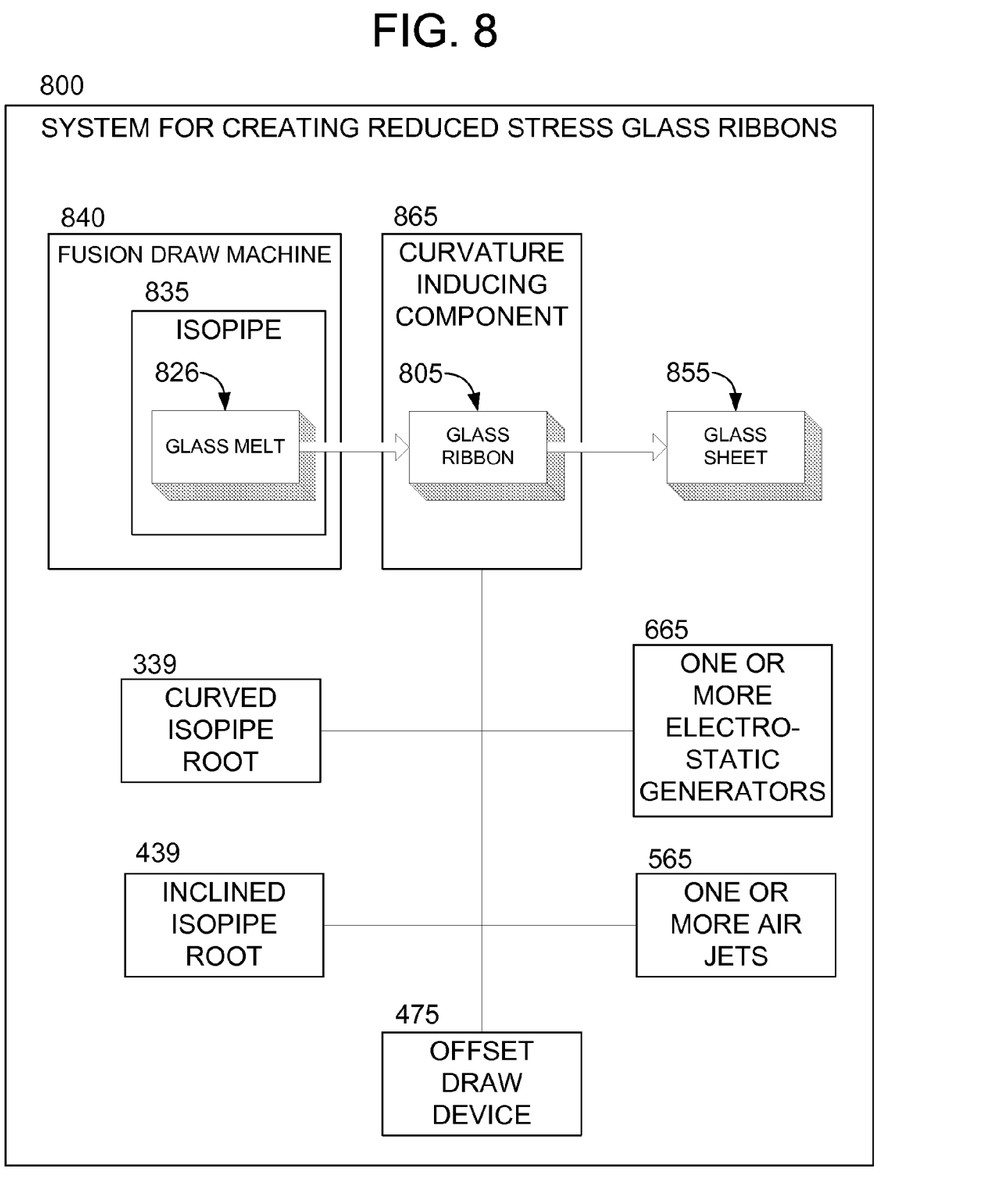
FIG. 8 is a block diagram illustrating a system related to creation of curved glass in accordance with one or more embodiments of the present invention.

Referring to FIG. 8, a block diagram illustrates a system 800 related to improved shape stability in glass during creation of glass ribbons 805 in accordance with one or more embodiments of the present invention. System 800 is a system for creating improved shape stability in glass ribbons 805. System 800 may include a fusion draw machine 840 and at least one curvature inducing component 865. FDM 840 includes an isopipe 835 for the drawing of molten glass as glass melt 826. The glass melt 826 overflows from the isopipe 835 and is drawn down to the curvature inducing component 865, where a curved is induced in glass ribbon 805. After the curved glass ribbon 805 sets, the curved glass ribbon 805 may be cut into glass sheets 855. The glass sheets 855 may be used to form sheets of improved shape stability and reduced-stress display glass. The cutting of curved glass ribbon 805 may occur outside of system 800.

The curvature inducing component 865 may incorporate one or more aspects of the embodiments and/or methods discussed in FIG. 3, FIG. 4, FIG. 5, FIG. 6 and FIG. 7. For instance, curvature inducing component 865 may include a curved isopipe root 339, an inclined isopipe root 439, an offset draw device 475, one or more air jets 565, and/or one or more electrostatic generators 665. The selection, or possible combination, of curvature inducing components 865 depends largely on the manufacturing parameters of a given system and selected materials. As circumstances change, not the least of which is the associated cost of retooling, a person of ordinary skill in the art may adjust the selection and effect of the curvature inducing component to achieve a desired outcome.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of improving shape stability in a glass ribbon drawn from an isopipe overflowing with molten glass, the method comprising:
   inducing a bowed curvature transversely across substantially the entire glass ribbon in a plane extending generally perpendicular to the glass ribbon during a downdraw process, thereby creating a bowed glass ribbon; and
   cooling the bowed glass ribbon through a glass transition temperature of the glass ribbon so that the bowed curvature is set in the bowed glass ribbon.

2. The method of claim 1, wherein the step of inducing a bowed curvature in the glass ribbon includes inclining the isopipe.

3. The method of claim 2, wherein the incline of the isopipe comprises an angle in the range from 5 to 20 degrees from vertical.

4. The method of claim 2, wherein a root of the isopipe is inclined.

5. The method of claim 1, wherein the step of inducing a bowed curvature in the glass ribbon includes drawing the glass ribbon in an inclined ribbon draw direction.

6. The method of claim 5, wherein the inclined ribbon draw direction comprises an angle in the range from 5 to 20 degrees from vertical.

7. The method of claim 1, wherein the step of inducing a bowed curvature in the glass ribbon includes applying air pressure to a first side of the glass ribbon, thereby creating a pressure differential between the air pressure on the first side of the glass ribbon and the air pressure on a second side of the glass ribbon.

8. The method of claim 7, wherein the pressure differential is between 2 and 15 N/m2.

9. The method of claim 7, wherein one or more air jets apply the air pressure.

10. The method of claim 9, wherein the air jets comprise an array of air jets of 3×3 to 5×5.

11. The method of claim 7, wherein a positive pressure is applied to the first side of the glass ribbon and a negative pressure is applied to the second side of the glass ribbon.

12. The method of claim 1, wherein the bowed curvature in the glass ribbon has a curvature radius ranging from 5 to 50 meters, thereby creating a bow in the glass ribbon ranging from 5 mm to 100 mm.

13. A method of improving shape stability in a glass ribbon drawn from an isopipe overflowing with molten glass, the method comprising:
   forming the glass ribbon with a curved isopipe having a curvature in a plane extending generally perpendicular to and substantially transversely across the glass ribbon, thereby inducing a curvature transversely across the glass ribbon in a plane extending generally perpendicular to the glass ribbon during a downdraw process, thereby creating a curved glass ribbon; and cooling the curved glass ribbon through a glass transition temperature of the glass ribbon so that the curvature is set in the curved glass ribbon.

14. The method of claim 13, wherein a root of the isopipe is formed with the curvature.

15. A method of improving shape stability in a glass ribbon drawn from an isopipe overflowing with molten glass, the method comprising:

applying electrostatic force to a first side of the glass ribbon, thereby generating an electric field differential across the glass ribbon and inducing a curvature transversely across the glass ribbon in a plane extending generally perpendicular to the glass ribbon during a downdraw process, thereby creating a curved glass ribbon; and cooling the curved glass ribbon through a glass transition temperature of the glass ribbon so that the curvature is set in the curved glass ribbon.

16. The method of claim 15, wherein one or more electrostatic force generators apply the electrostatic force.

17. A method of creating improved shape stability in display glass, the method comprising:

down drawing a glass ribbon from an isopipe overflowing with molten glass;

inducing a curvature extending transversely across substantially the entire glass ribbon in a plane extending generally perpendicular to the glass ribbon during the down drawing, thereby creating a curved glass ribbon;

cooling the curved glass ribbon through a glass transition temperature of the glass ribbon so that the curvature is set in the curved glass ribbon; and preparing display glass sheets from the curved glass ribbon; and wherein inducing a curvature in the glass ribbon includes one or more of: using a curved isopipe having a desired curvature in a plane extending generally perpendicular to the glass ribbon; using an inclined isopipe; drawing the glass ribbon in an inclined ribbon draw direction; and applying electrostatic force to a first side of the glass ribbon, thereby generating an electric field differential across the glass ribbon.

* * * * *